2,900,027
OIL WELL TREATMENT

Ronald H. Cooper, Clare, Mich., assignor to The Dow Chemical Company, Midland, Mich., a corporation of Delaware No Drawing. Application September 26, 1956
Serial No. 612,093

16 Claims. (Cl. 166—33)

This invention relates to an improved treatment for wells and like borings into the earth's surface in order to control the movement of unconsolidated sand and other loose matter into the well bore. It also relates to well bores that have been benefited by such treatment.

The existence of severe sanding conditions in an oil or gas producing interval, for example, of a well bore may cause many difficulties and add considerably to the cost of operations. The requirement to remove loose sand from an oil well bore hole or the like and the damaging erosive effect that loose sand may have on equipment operating within the well bore are, by way of illustration, typical problems that may often be encountered in this connection.

It is known to seal off unconsolidated sand intervals in oil well bores by means of phenolic resin compositions that are pumped under pressure to the desired portion of the bore and cured in situ to achieve the desired sealing effect. However, certain shortcomings are inherent in the compositions and techniques that are available for such utilization.

By way of illustration, it is often difficult to control the porosity or permeability of the known phenolic resin compositions that are employed for sealing off unconsolidated sand intervals in well bores. In many cases, decreases or reductions in permeability that are on the order of up to 65 percent are encountered in the producing sand interval portions of the well that have been treated with the known phenolic resin compositions. This of course may result in an undersirably excessive restriction in the productivity rate of the treated well bore. Furthermore, many of the known phenolic resin compositions, especially those that are acid catalyzed, suffer substantial losses in their bonding strength upon prolonged exposure to the relatively elevated temperatures to which they may be subject at greater depths in many well bores. As a consequence, their effectiveness for sealing the well bore may oftentimes be minimized in areas of greatest need which may seriously hamper their utility for the desired purpose. In addition, many of the known phenolic resin compositions must be employed in substantial quantities in order to treat the unconsolidated intervals of well bores. It is not uncommon to require as much as 50 gallons or more of the known phenolic resin compositions in order to treat each foot of a particular interval that requires consolidation. The use of resin in such sizeable quantities is an item of not inconsequential expense and also necessitates curing large masses of resin in situ in the treated areas of the well bore. Oftentimes such considerable resin concentrations along the intervals being treated requires that curing of the applied resin in the well bore be permitted for as long as 8 to 24 hours or more to effect the desired consolidation.

It would be advantageous to provide an improved method for treating wells to control unconsolidated sand intervals therein that would overcome these and other shortcomings that beset the known techniques for accomplishing such results. Specifically, it would be extremely beneficial to provide a well treatment, particularly for oil and gas wells, wherein the sealed off portions of the well bore would not be excessively restricted by a relatively impervious treating medium; wherein the benefit of treatment would not be diminished or nullified as a consequence of relatively high well temperatures in the vicinity of the treated interval; and wherein moderate requirements for treating materials would suffice to provide eminently satisfactory results.

These desiderata and many other advantages and benefits may be achieved by the well treating method of the present invention which comprises supplying, under sufficient depositing pressure, to an unconsolidated sand interval in a well bore a dry thermoplastic-thermosetting mixture comprising a preponderant proportion of a finely divided particulated, inert aggregate material that has been coated and uniformly mixed with an active powdered magnesium oxide catalyzed aqueous phenolic liquid resin binder and which, advantageously, may contain a small quantity of an accelerator curing agent for phenolic resins such as hexamethylene tetramine; agglomerating the mixture under pressure against the sand in said interval; and curing the deposited, agglomerated mixture under pressure in situ against the unconsolidated sand interval to form a porous, resin bonded aggregate matrix formation against said interval that prevents movement of sand into the well bore. Advantageously, the resin coated aggregate mixture is introduced into the well bore and supplied to the unconsolidated sand interval while it is dispersed in an inert liquid vehicle such as crude oil, diesel fuel, kerosene or any other suitable vehicle, that carries the thermoplastic-thermosetting mixture to the desired location and deposits it against the sand interval under a suitable pressure. More advantageously, the coated aggregate mixture is dispersed in the inert vehicle and introduced to the well at a temperature beneath its thermoplastic temperature, as at normal atmospheric temperatures, so that it does not bond together or agglomerate in the dispersion before being deposited against the interval in the well. Optimum results may usually be achieved when the resin coated aggregate mixture is supplied under a sufficient depositing pressure (depending on the pressure that may be required for such purposes in particular wells) to the unconsolidated sand interval in bottom-hole surroundings at a temperature between about 150° F. and 400° F. The curing or thermosetting of the applied mixture under such conditions to form the desired sand movement resisting porous medium formation against the uncontrolled sand interval will usually be accomplished within a time period of 30 minutes to 2 hours although somewhat longer time periods may be necessary if the resin is being cured at thermosetting temperatures beneath about 200° F. After having been cured in situ, the porous medium can be easily rebored if it is desired to extend the depth of the well beyond the treated interval or to reopen a bore that passes through a treated interval.

The magnesium oxide catalyzed coated aggregate mixtures that are employed in the practice of the present invention may advantageously be in general accordance with certain embodiments of the compositions set forth in the copending application of Ronald H. Cooper for Improved Phenolic Resin Compositions having Serial No. 512,283 which was filed on September 26, 1956, to issue as United States Letters Patent No. 2,869,194. The magnesium oxide catalyzed phenolic resin coating on the aggregate of such mixtures is self-setting or auto-hardening at room temperatures to a thermoplastic-thermosetting mass due to the dehydrating and catalytic effect of the magnesium oxide on the liquid resin coating. The time required for the applied catalyzed resin coating to auto-harden to a dry condition depends to a great extent, as has been detailed in the referred to copending application, on the activity of the magnesium oxide catalyst and the relative proportion in which it is employed with the resin.

The coated aggregate mixtures that are employed may beneficially be comprised of a preponderant proportion of the finely divided aggregate coated with from about 3 to 25 percent by weight, based on the weight of the mixture and depending on the porosity of the filler, of the aqueous phenolic liquid resin and between about 10 to 25 percent by weight, based on the weight of the resin in the mixture, of the active powdered magnesium oxide catalyst. When an accelerator curing agent for phenolic resins (such as hexamethylene tetramine) is employed, it is ordinarily beneficial to employ it in the amount of about 10 percent by weight, based on the weight of the resin in the mixture. Paraformaldehyde and other curing agents for phenolic resins including various low molecular weight polyamines may also be suitably employed. Relatively impervious fillers, such as sand, may ordinarily be best coated with from about 3 to 10 percent by weight of the resin whereas it may sometimes be of greater benefit to employ between about 10 and 25 percent by weight of the resin for coating more porous fillers. Care should be taken to avoid the use of excessive quantities of the resin for coating the aggregate, taking its natural porosity into account, in order to circumvent the possibility of causing the sealing matrix in the well bore to have too low a degree of porosity and permeability.

The particulate aggregate that is employed in the mixtures that are used in the practice of the present invention should be relatively hard, strong, non-friable and inert material that has relatively good resistance to erosion. Beneficially, the aggregate should have an average particle size in the range from about minus 10 plus 20 to minus 20 plus 40 mesh in the U.S. Standard Sieve Series. Advantageously, relatively coarse, angular or round grained sand having these characteristics may be employed. If desired, however, a suitable aggregate may be provided with such materials as finely divided gravel, crushed walnut shells or the like, ground corn cobs, wood chips, crushed brick or slag and metal shavings that are comminuted to the desired degree. Crushed walnut shells are illustrative of the type of relatively more porous filler that may most advantageously be coated with from 10 to 25 percent by weight of resin on the total weight of the mixture.

The aqueous phenolic liquid resin that is employed for coating the sand in compositions according to the invention may advantageously be a liquid phenol-aldehyde condensation product such as a liquid phenol-formaldehyde resin. Such resins may be prepared conveniently by reacting aqueous mixtures of phenol and formaldehyde, in a known manner, under the influence of basic catalysis. Ordinarily, such liquid resins are prepared with a greater than 1:1 mole ratio of formaldehyde to phenol, respectively. It may frequently be desirable for a phenol-formaldehyde liquid resin to be employed that has a mole ratio of formaldehyde to phenol in the neighborhood of 1.45:1 with a solids content of at least 50 to 70 percent by weight. The viscosity of such an aqueous phenol-formaldehyde resin, which may oftentimes be characterized as being a stage "A" resin, may vary from about 100 to 1,000 centipoises when measured at a temperature of about 77° F. The liquid resin may have a pH between about 5 and 9. Preferably, the liquid phenol-formaldehyde resin that is utilized has a solids content in the aqueous vehicle of about 70 percent by weight and a pH between 5 and 7 with a viscosity at 77° F. of about 500 centipoises.

The active magnesium oxide powder that is utilized may advantageously have a degree of activity, as may be expressed by its initial setting time according to A.S.T.M. Specification No. C254–50T, in the neighborhood of about ½ hour. It is usually desirable for the magnesium oxide powder that is employed to be in finely divided form, such as one having an average particle size that is not larger than about 40 mesh in the U.S. Standard Sieve Series.

In formulating the well treating coated aggregate mixtures that are employed in the practice of the invention, it is usually extremely beneficial to premix the magnesium oxide catalyst and the accelerator curing agent, if one is employed, with the sand or other aggregate material before the liquid resin is applied to coat the aggregate particles. It is essential to achieve a thorough and intimate dispersion or interblending of all the ingredients in the coated aggregate mixtures that are employed. This may be readily achieved by the utilization of efficient mixing or mulling apparatus of conventional varieties.

The coated aggregate mixtures, after being formulated, may be directly and immediately added to the crude oil or other liquid vehicle which is immiscible with and inert to the resin coating for introduction into the well bore or they may be permitted to self-set or auto-harden to a dry, free-flowing condition before being incorporated in suspension in the crude oil or other vehicle for supply to the unconsolidated sand interval that is desired to be treated. Equivalent results may be achieved by either technique. It is best, as has been indicated, to introduce the coated aggregate to the well bore at a lower than softening temperature for the auto-hardened resin. The proportion of the coated aggregate mixture that is incorporated in the crude oil vehicle for introduction to the well bore is relatively unimportant, since the mixture is literally filtered out of the vehicle for deposit against the unconsolidated sand interval being traversed. In this regard, however, too thick a slurry should be avoided so that a non-uniform depositing application of the mixture on the sand interval is not encountered. On the other hand, excessively thin slurries may require excessive quantities of the vehicle to be handled and pumped into the well during the treatment. Ordinarily, a coated aggregate mixture in an oil vehicle slurry that contains from about one to one and one-half pounds of a coated sand aggregate suspended in each gallon of oil having a room temperature viscosity between 500 and 1000 centipoises may be found satisfactory. Greater proportions of lighter aggregates, such as coated crushed walnut shells, may often be suitably incorporated in the vehicle. Little difficulty is encountered in depositing the coated aggregate mixture against the sand interval in the well bore. The plasticity of the uncured mixture permits it to flow or be forced readily into a desired cavity that requires to be treated and sealed against sand movement.

Unconsolidated sand intervals in bore holes occurring at levels as deep as 20,000 feet may often be treated in accordance with the present invention since, in many wells, the average temperature at such depths is not in excess of about 400° F. It may be prudent to forego the treatment that is available from the present invention when the interval to be treated is situated in a location having an average temperature that is much in excess of about 400° F. Such elevated temperatures many disintegrate the resin binder that provides the sand-movement resisting matrix and thus minimize or nullify the benefit of the treatment. It is difficult to cure the resin in the mixture at temperatures beneath about 150° F. Hence, when intervals at shallow depths are being treated, wherein the well temperature does not exceed this lower value, it may be necessary to provide heat through or from the vehicle or by other means in order to properly thermoset or cure the deposited coated aggregate mixture.

The use of a resin coated aggregate in the practice of the present invention possibilitates the utilization of less resin per foot of interval that must be sealed in the well bore in comparison with conventional well treatments involving ordinary resin compositions for the purpose. Since the aggregate that is employed, such as sand, is coated with a thin layer of resin it is also possible to achieve quicker overall treating times than when larger resin masses, as in conventional treatments, are used. This is due to the possibility of more quickly melting and curing the thin resin layers in the coated aggregate mixtures used in the present treatment.

The porous formulations that are provided by the agglomerated, cured coated aggregate mixtures do not tend to restrict the rate of flow or production that may be obtained from a treated well. The porosity of a cured, resin bonded coated aggregate medium that has been prepared for employment in the practice of the present invention usually averages at a value between 30 and 33 percent of its entire volume. It ordinarily, for example, is so permeable as to permit water to flow through about one inch thick sections of the medium, under a pressure of only about 0.43 pounds per square inch gauge, at rates between about 4 and 12 gallons per minute.

In addition, the sand movement-resisting formulations achieved in the practice of the invention do not lose strength upon exposure to heat at elevated temperatures. To the contrary, within the described temperature limitation, the bond strength of a resin bonded coated aggregate mixture will increase at greater temperatures and with increased exposure periods. This is illustrated in the following tabulation, wherein porous media from two coated aggregate mixtures were formed in the shape of figure-eight briquettes that covered an area of about 4.1 square inches and had a volume of about 4.1 cubic inches and were subsequently exposed to heat at elevated temperatures under an applied pressure of about 80 pounds per square inch, gauge, with the effect of such exposure upon their tensile strengths being tested and observed at different intervals. Each of the compositions was prepared with a sand aggregate having an average 20–40 mesh (U.S. Sieve Series) particle size coated with an aqueous phenol-formaldehyde liquid resin that had a formaldehyde to phenol mole ratio of about 1.45:1, a solids content of about 70 percent by weight, a pH of about 5 and a viscosity at 77° F. of about 500 centipoises. The magnesium oxide catalyst was a 40 mesh powder having a ½ hour initial setting time. For purposes of comparison, a similar porous medium (medium "C") was prepared and tested from an analogous resin coated sand aggregate mixture in which benzene sulfonyl chloride, an acid catalyst for phenolic resins, was employed.

walnut shell aggregates with varied proportions of catalyst and resin coating within the indicated ranges.

Certain changes and modifications in the practice of the present invention can be readily entered into without substantially departing from its intended spirit or scope. Therefore, it is to be fully understood that the invention is not to be interpreted by the preferred deictic embodiments thereof that are contained in the foregoing description and specification. Rather, it is to be construed in the light of what is set forth and defined in the hereto appended claims.

What is claimed is:

1. Method for treating a well penetrating the earth's surface to seal sand in an unconsolidated interval present therein from movement into the bore hole which comprises forming a dispersion in and with an inert liquid vehicle of a thermoplastic-thermosetting mixture comprising a preponderant proportion of a finely divided, particulated, inert aggregate material that has been coated and uniformly mixed with a minor proportion of an active powdered magnesium oxide catalyzed aqueous phenolic liquid resin binder; introducing said dispersion into said well bore; moving said dispersion in said well bore to the unconsolidated sand interval therein to supply said mixture, under sufficient depositing pressure, to said interval, said interval occurring in surroundings in said well that are at a temperature between about 150 and 400° F.; agglomerating the mixture under pressure against the sand in said interval; and permitting the deposited, agglomerated mixture to cure under pressure in situ against the unconsolidated sand interval under the influence of the surrounding temperature to form a porous, resin bonded aggregate matrix formation against the sand in said interval; said phenolic liquid resin being an aqueous phenol-formaldehyde liquid resin that has a greater than 1:1 mole ratio of formaldehyde to phenol, respectively, a solids content of at least about 50 percent by weight, a pH between 5 and 9 and a viscosity at 77° F. between about 100 and 1,000 centipoises; said powdered magnesium oxide having a setting time of up to about ½ hour.

2. The method of claim 1, wherein the coated aggregate mixture is introduced into the bore hole at a temperature lower than about 150° F.

3. Method for treating a well penetrating the earth's surface to seal sand in an unconsolidated interval present therein from movement into the bore hole which comprises forming a dispersion in and with an inert liquid

TABLE

*Tensile strength of various oil well media as effected by temperature and time*

| Medium | Weight percent of resin in formulating mixture | Weight percent of catalyst in formulating mixture [a] | Weight percent sand in formulating mixture | Tensile strength, p.s.i., after 125° F. exposure for 24 hours | Tensile strength, p.s.i., after 212° F. exposure for— | | | Tensile strength, p.s.i., after 300° F. exposure for 5 hours |
|---|---|---|---|---|---|---|---|---|
| | | | | | 5 hours | 72 hours | 114 hours | |
| "A" | 4.00 | MgO/0.40 | 95.60 | 100 | 190 | 260 | 265 | 400 |
| "B" | 4.00 | MgO/0.40 Hexa/0.28 | 95.32 | 120 | 170 | 240 | 235 | 400 |
| "C" | 4.00 | BSC/0.50 | 95.50 | 170 | 140 | 135 | (b) | 100 |

[a] Note.—MgO is powdered magnesium oxide catalyst. Hexa is hexamethylene tetramine. BSC is benzene sulfonyl chloride.
[b] Note.—Not observed.

By way of further illustration, coated aggregate mixtures having formulations similar to those set forth in the preceding tabulation for the preparation of media "A" and "B" were found to be particularly adapted for the sealing treatment of unconsolidated sand intervals in oil wells in practicing the method of the invention. Similar formulations prepared with ground walnut shells were also found to be especially well suited for such purpose as were other mixtures prepared with sand and crushed vehicle of a thermoplastic-thermosetting mixture comprising a preponderant proportion of finely divided, particulated, inert aggregate material that has been coated and uniformly mixed with a resin binder containing between about 3 and 25 percent by weight, based on the weight of the mixture, of an aqueous phenolic liquid resin and about 10 and 25 percent by weight, based on the weight of the resin in the mixture, of an active powdered magnesium oxide catalyst introducing said dispersion into said well bore; moving said dispersion in said well bore to the unconsolidated sand interval therein to supply said mixture, under sufficient depositing pressure, to said interval; said interval occurring in surroundings in said well that are at a temperature between about 150 and 400° F.; agglomerating the mixture under pressure against the sand in said interval; and permitting the agglomerated mixture to cure under pressure in situ against the unconsolidated sand interval under the influence of the surrounding temperature to form a porous, resin bonded aggregate matrix formation against the sand in said interval; said phenolic liquid resin being an aqueous phenol-formaldehyde liquid resin that has a greater than 1:1 mole ratio of formaldehyde to phenol, respectively, a solids content of at least about 50 percent by weight, a pH between 5 and 9 and a viscosity at 77° F. between about 100 and 1,000 centipoises; said powdered magnesium oxide having a setting time of up to about ½ hour.

4. The method of claim 3 and including the step of uniformly incorporating a small quantity of an accelerator curing agent for phenolic resins in said coated aggregate mixture.

5. The method of claim 3 and including the step of uniformly incorporating in the neighborhood of about 10 percent by weight, based on the weight of the resin in the mixture, of hexamethylene tetramine in said coated aggregate mixture.

6. The method of claim 3 wherein the aggregate in said mixture is a hard, non-friable and inert particulated material that has an average particle size in the range from about minus 10 plus 20 to minus 20 plus 40 in the U.S. Sieve Series.

7. A method in accordance with the method set forth in claim 6 wherein the aggregate is sand that is coated with between about 3 and 10 percent by weight of said liquid resin.

8. A method in accordance with the method set forth in claim 6 wherein the aggregate is crushed walnut shells that is coated with between about 10 and 25 percent by weight of said liquid resin.

9. The method of claim 3 wherein the aqueous phenolic liquid resin is a phenol-formaldehyde condensation product that has about a 1.45:1 mole ratio of formaldehyde to phenol, respectively, a solids content of about 70 percent by weight, a pH between about 5 and 7 and a viscosity at 77° F. about 500 centipoises.

10. The method of claim 3 wherein the active powdered magnesium oxide catalyst has an average particle size that is not larger than about 40 mesh in the U.S. Sieve Series and an initial setting time of about ½ hour.

11. A method in accordance with the method set forth in claim 3 wherein the liquid vehicle for dispersing said coated aggregate mixture is crude oil.

12. The method of claim 3, wherein said dispersion is introduced into the bore hole at a temperature lower than about 150° F.

13. The method of claim 3, wherein the coated aggregate mixture is supplied to an unconsolidated sand interval in bottom-hole surroundings.

14. The method of claim 3, wherein the coated aggregate mixture is supplied to an unconsolidated sand interval at a temperature between about 200° F. and 400° F. and maintained against said interval under a depositing pressure for a period of time between about 30 minutes and 2 hours.

15. In combination with an unconsolidated sand interval in the bore of a well penetrating the earth's surface, a porous, sealing medium deposited against said interval, said medium being comprised of a cured, thermoset, agglomerated mixture of a preponderant proportion of a finely divided, particulated, inert aggregate material that has been coated and uniformly mixed with a minor proportion of an active powdered magnesium catalyzed aqueous phenolic liquid resin binder that, optionally, contains a small quantity of an accelerator curing agent for phenolic resins; said phenolic liquid resin being an aqueous phenol-formaldehyde liquid resin that has a greater than 1:1 mole ratio of formaldehyde to phenol, respectively, a solids content of at least about 50 percent by weight, a pH between 5 and 9 and a viscosity at 77° F. between about 100 and 1,000 centipoises; said powdered magnesium oxide having a setting time of up to about ½ hour.

16. The combination of claim 15 in a well for oil or gas.

References Cited in the file of this patent

UNITED STATES PATENTS

| | | |
|---|---|---|
| 2,573,690 | Cardwell et al. | Nov. 6, 1951 |
| 2,729,553 | Price | Jan. 3, 1956 |

OTHER REFERENCES

How Plastic-Coated Walnut Shells Control Loose Sands, by Henderson et al., World Oil, April 1956, pp. 271, 272, 274, and 276.

Ellis: Synthetic Resins, published 1935, by Reinhold, pp. 370 and 436 to 438.